United States Patent
Story, Jr. et al.

(10) Patent No.: US 9,213,705 B1
(45) Date of Patent: Dec. 15, 2015

(54) PRESENTING CONTENT RELATED TO PRIMARY AUDIO CONTENT

(75) Inventors: Guy A. Story, Jr., New York, NY (US); Ajay Arora, New York, NY (US)

(73) Assignee: Audible, Inc., Newark, NJ (US)

( * ) Notice: Subject to any disclaimer, the term of this patent is extended or adjusted under 35 U.S.C. 154(b) by 261 days.

(21) Appl. No.: 13/330,404

(22) Filed: Dec. 19, 2011

(51) Int. Cl.
G06F 17/30 (2006.01)

(52) U.S. Cl.
CPC .............................. *G06F 17/30056* (2013.01)

(58) Field of Classification Search
CPC ................ G06F 17/30026; G06F 17/30056
USPC ................................. 707/769, 771, 915, 916
See application file for complete search history.

(56) References Cited

U.S. PATENT DOCUMENTS

| | | | |
|---|---|---|---|
| 5,533,757 A * | 7/1996 | Morris | 281/15.1 |
| 8,434,685 B1 | 5/2013 | Lewbel et al. | |
| 8,792,818 B1 * | 7/2014 | Colebank et al. | G09B 5/062 434/317 |
| 8,832,319 B2 | 9/2014 | Kessel et al. | |
| 2003/0086409 A1 * | 5/2003 | Karas et al. | 370/350 |
| 2004/0024739 A1 * | 2/2004 | Copperman et al. | 707/1 |
| 2005/0160360 A1 * | 7/2005 | Nadamoto et al. | 715/513 |
| 2009/0165140 A1 | 6/2009 | Robinson et al. | |
| 2009/0204402 A1 * | 8/2009 | Marwaha et al. | 704/260 |
| 2009/0271438 A1 * | 10/2009 | Agapi et al. | 707/104.1 |
| 2010/0023485 A1 * | 1/2010 | Cheng Chu | 707/3 |
| 2011/0195388 A1 | 8/2011 | Henshall et al. | |
| 2012/0173659 A1 | 7/2012 | Thaxter et al. | |
| 2012/0204086 A1 | 8/2012 | Stoner et al. | |
| 2012/0246343 A1 | 9/2012 | Story et al. | |
| 2012/0310642 A1 * | 12/2012 | Cao et al. | 704/235 |
| 2012/0315009 A1 * | 12/2012 | Evans et al. | 386/230 |
| 2013/0080881 A1 | 3/2013 | Goodspeed et al. | |
| 2013/0091429 A1 * | 4/2013 | Weng et al. | 715/716 |
| 2013/0124988 A1 | 5/2013 | Lettau | |
| 2013/0191708 A1 | 7/2013 | Song | |

OTHER PUBLICATIONS

Bookes, Music Lovers: Why Aren't You Using Soundcloud?, Dec. 8, 2011.*
Entheos, Loading External Images in Flash using the loadMovie Actionscript Function, 2007.*
Weidenbaum, Quotes of the Week: SoundCloud's Exemplary Comments System, 2009.*

* cited by examiner

*Primary Examiner* — William Spieler
(74) *Attorney, Agent, or Firm* — Knobbe, Martens, Olson & Bear, LLP

(57) ABSTRACT

Systems and methods are provided for generating a presentation associated with primary audio content. In some embodiments, companion content associated with the audio content may be retrieved from one or more data stores. The companion content may include textual content corresponding to the audio content. One or more keywords associated with at least a portion of the companion content may then be determined. Additional content associated with the one or more keywords may be retrieved from one or more data stores, where the additional content may include at least one image. At least one of the one or more images may then be presented for display during playback of the audio content, such that each of the one or more images is presented for display during playback of a corresponding portion of the audio content.

20 Claims, 7 Drawing Sheets

PRESENTING CONTENT RELATED TO PRIMARY AUDIO CONTENT

BACKGROUND

Publishers and/or authors frequently offer audio versions of their books or other written works to consumers. A user will often listen to an audio book or other narration audio (such as spoken word recordings of magazine or newspaper articles, podcasts, text-to-speech audio content, etc.) using a device that includes both the capability to play audio content and the capability to display visual content. For example, a portable computing device, mobile phone, tablet computer, or electronic book reader ("e-book reader") capable of playing audio content may also include a display device, such as a touch screen display. Although many such computing devices are frequently utilized by users to listen to digital audio books and other narrated audio recordings, the associated display capabilities of the devices are often underutilized during playback of the audio content. For example, a user may simply be presented with basic audio controls (such as play and pause options) on the display device during playback of the audio content.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
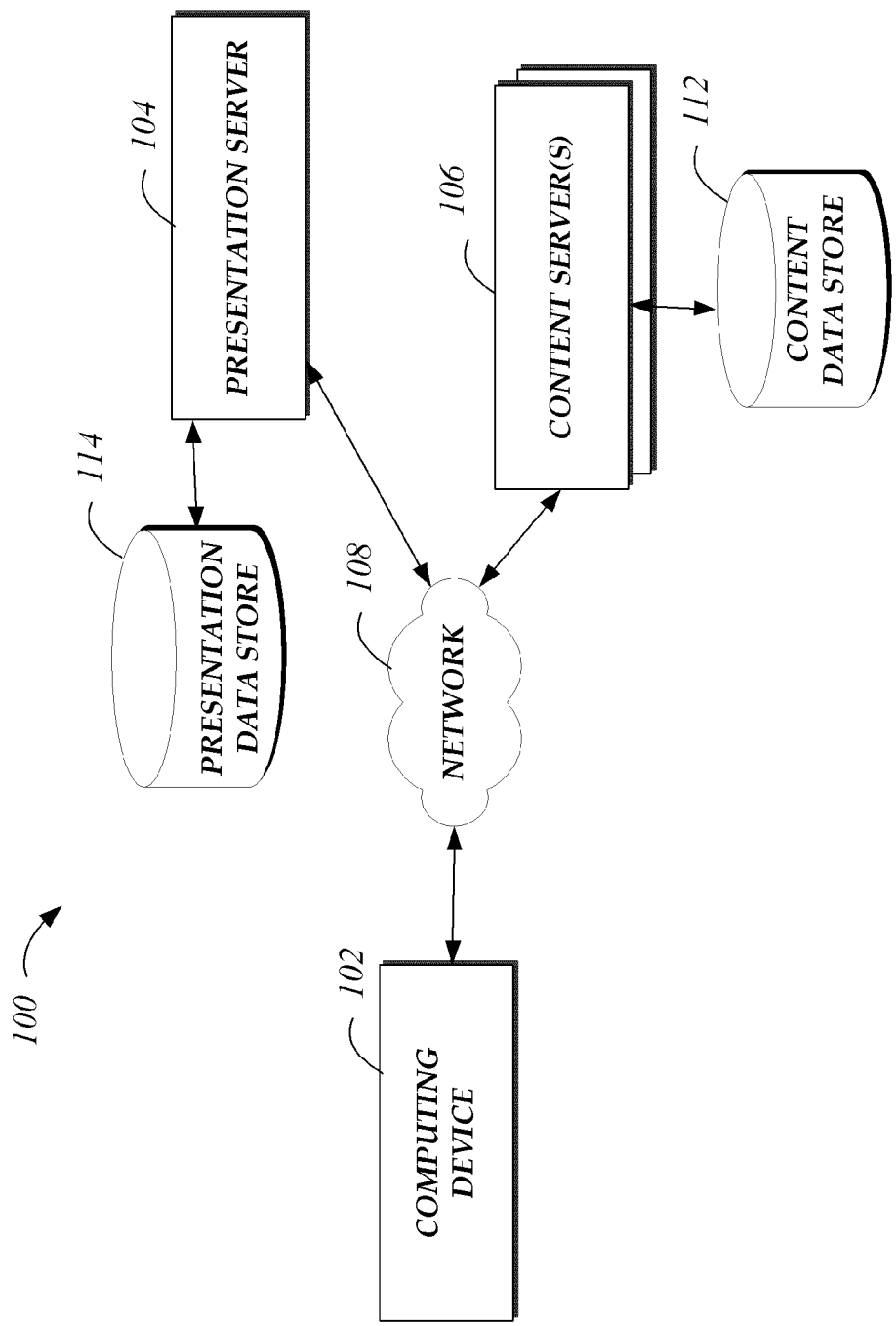
FIG. 1 is a block diagram depicting an illustrative operating environment in which content related to primary audio content may be determined and then presented by a computing device.

Generally described, aspects of the present disclosure relate to determining images and/or other content to associate with a primary content item, such as an audio book or other audio content. The determined images or other content may then be presented for display on a computing device while the computing device plays the related audio content. For example, while a user listens to audio content via a computing device, a presentation module as disclosed herein may cause the computing device to present for display a different image during audio playback of different portions of the audio content, where each image has been determined by the presentation module to relate to the subject matter of the given portion of the audio content, and/or relate to the audio content as a whole. For example, in some embodiments, a user of a computing device may listen to an audio book using the computing device while simultaneously being presented with a variety of images, videos, and/or other content that the presentation module has determined are related to the portions of the audio content currently being played by the computing device.

The images, videos, and/or other additional content may be determined, for example, based on metadata associated with an underlying work associated with the audio content; companion content associated with the audio content; synchronization information; keywords; and/or other information, as discussed further below. While the additional content determined by the presentation module to be presented to the user during playback of audio content is often described herein using the example of image content, in some embodiments, the additional content may include content of other types, including but not limited to video content, additional audio content, textual content, and/or other types of content.

As used herein, a "presentation" generally refers to visual and/or additional audio content that may be presented for display and/or for audio output by a computing device while a given portion of primary audio content is output by the computing device. For example, providing a presentation associated with a given chapter of an audio book may include, while the audio content of the chapter is played to a user, presenting for display a number of images or other visual content that have been determined to be associated with various portions of the chapter. In some embodiments, providing a presentation may also include supplementing the primary audio content with additional related content, such as music or sound effects. In some embodiments, a presentation may refer specifically to visual elements (such as images, video, visual transitions, filters and/or effects) that are associated with time markers within the audio content or with some other indication of a discrete portion of audio content, such as a text marker, position of a word, sentence or paragraph, etc. In other embodiments, a presentation may refer to the entire visual and audio output presented to the user during playback of the primary audio content.

In some embodiments, a presentation module as disclosed herein may generate a presentation associated with a given portion of primary audio content by retrieving, from one or more data stores, companion content associated with the audio content. The companion content may include textual content corresponding to the audio content. The presentation module may then determine one or more keywords associated with at least a portion of the companion content. The presentation module may then retrieve, from one or more data stores, additional content associated with the one or more keywords, where the additional content includes at least one of an image, a video and/or additional audio content. The presentation module may then present for display at least one of the one or more images, video or other content during playback of the primary audio content, such that the additional content is presented for display and/or audio output during playback of a corresponding portion of the primary audio content. In other embodiments, the presentation server may store the presentation information associating the additional content with at least a portion of the audio content, such that the presentation may be presented at a later time and/or by another computing device.

FIG. 1 depicts an illustrative operating environment 100 in which a computing device 102 and/or a presentation server 104 may determine content related to primary audio content, and in which the determined content may then be presented by the computing device 102. The depicted environment 100 includes a computing device 102, a presentation server 104, and one or more content servers 106 communicatively connected by a network 108, such as the Internet. Those skilled in the art will recognize that the computing device 102 and/or presentation server 104 may collectively be any of a number of computing devices that are capable of communicating over a network including, but not limited to, a laptop, personal computer, tablet computer, electronic book reader, personal digital assistant (PDA), hybrid PDA/mobile phone, mobile phone, smart phone, digital music player, and the like. In some embodiments, one of the computing device 102 and the presentation server 104 may implement aspects of the present disclosure without cooperating with another computing device. In the illustrated embodiment, the computing device 102 may output audio content, such as the content of an audio book, to a user while presenting for display visual content associated with the audio content, such as the user interfaces discussed below with reference to FIG. 3. The computing device 102 is discussed in more detail below in reference to FIG. 2.

In the illustrated embodiment, the presentation server 104 may determine content associated with primary audio content, such as by accessing information associated with image, audio and/or video content stored in one or more data stores, such as presentation data store 114, and/or communicating with one or more content servers 106. For example, the presentation server 104 may determine one or more images associated with the subject matter discussed in a given portion of narration audio content, and may send the image data to computing device 102 for display during playback of the relevant audio content on computing device 102, as will be further discussed below. In other embodiments, the computing device 102 may determine relevant content with which to supplement primary audio content without communicating with presentation server 104. In some embodiments, the presentation server 104 and/or content server(s) 106 may include computer hardware and software components similar to those described below with respect to the computing device 102.

In the environment shown in FIG. 1, the computing device 102 and/or presentation server 104 may communicate with the content server 106 via a communication network 108, such as the Internet or other communications link. Communications between the computing device and/or presentation server and the one or more content servers 106 may be secure, such as by encrypting or encoding the data exchanged. In some embodiments, the content server 106 may be operated by a third-party entity unrelated to the operator of the presentation server 104. For example, the one or more content servers 106 may provide access to various content data stores, such as content data store 112, that include image content, video content, textual content, audio content, and/or other types of content that are available for public use (such as royalty-free content) or for use according to a license.

As illustrated in FIG. 1, the content server 106 includes or communicates with a content data store 112. As further illustrated, the presentation server 104 includes or communicates with a presentation data store 114. The presentation data store 114 may include data regarding stored presentation settings, companion content (such as electronic book content or transcript text), book images, textual content, audio book keyword information, synchronization information associating portions of audio content with portions of companion content, user and demographic data, and/or other information. Those skilled in the art will appreciate that the presentation data store 114 may be local to the presentation server 104, may be remote to the presentation server 104, and/or may be a network-based service itself. In other embodiments, the presentation data store 114 may be local to the computing device 102 or the presentation server 104. Those skilled in the art will appreciate that the network 108 may be any wired network, wireless network or combination thereof. In addition, the network 108 may be a personal area network, local area network, wide area network, cable network, satellite network, cellular telephone network, etc., or combination thereof. Protocols and components for communicating via the Internet or any of the other aforementioned types of communication networks are well known to those skilled in the art of computer communications and, thus, need not be described in more detail herein.

Figure 2:
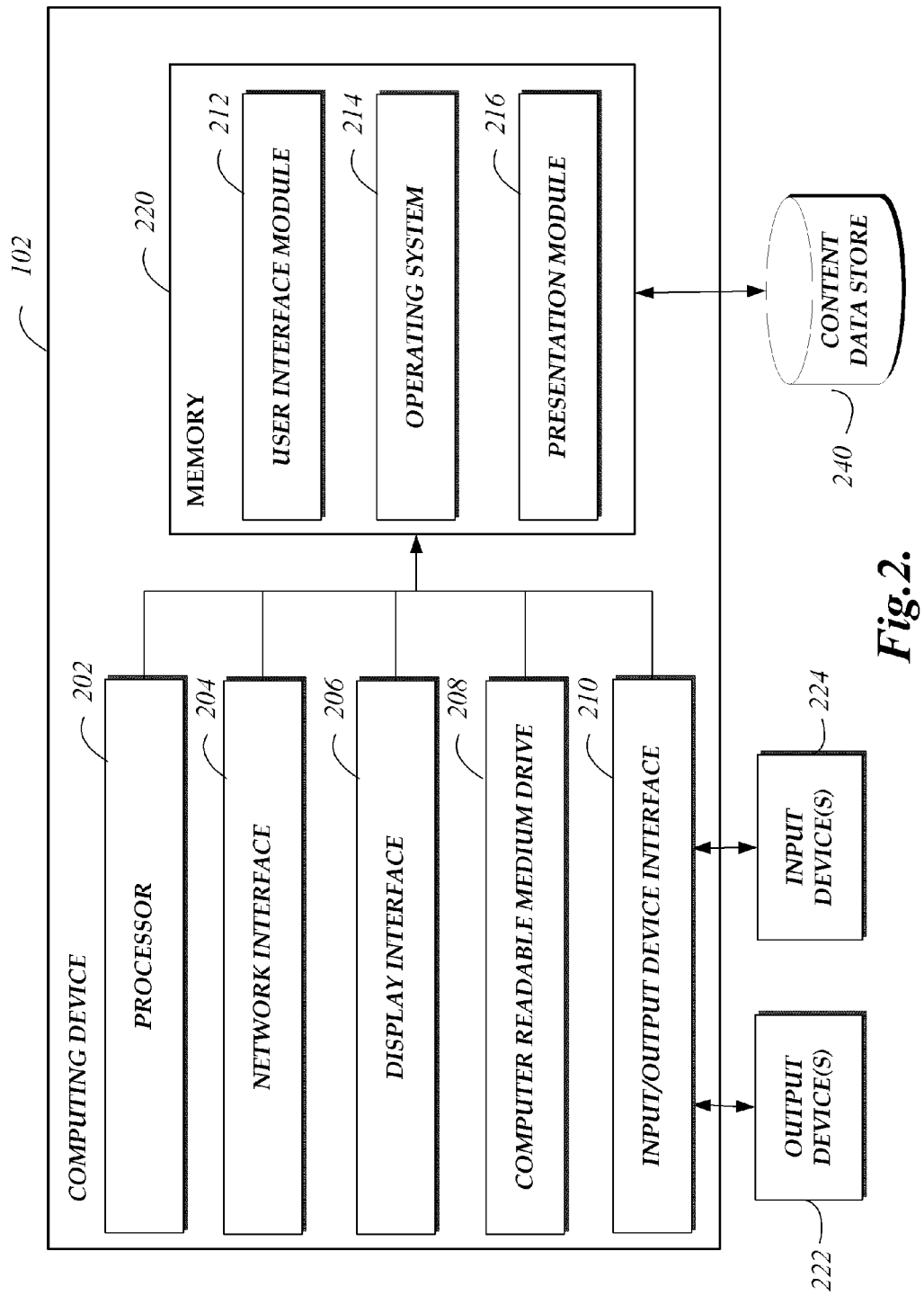
FIG. 2 depicts a general architecture of a computing device for presenting related content during playback of audio content.

FIG. 2 depicts a general architecture of a computing device 102 for presenting related content during playback of primary audio content. The computing device 102 may have one or more processors 202 in communication with a network interface 204, a display interface 206, a computer readable medium drive 208, and an input/output device interface 210, all of which communicate with one another by way of a communication bus. The network interface 204 may provide connectivity to one or more networks or computing systems. The processor(s) 202 may thus receive information and instructions from other computing systems or services via a network. The processor(s) 202 may also communicate to and from memory 220 and further provide output information or receive input information via the display interface 206 and/or the input/output device interface 210. The input/output device interface 210 may accept input from one or more input devices 224, including, but not limited to, keyboards, mice, trackballs, trackpads, joysticks, input tablets, trackpoints, touch screens, remote controls, game controllers, velocity sensors, voltage or current sensors, motion detectors, or any other input device capable of obtaining a position or magnitude value from a user. The input/output interface 210 may also provide output via one or more output devices 222, including, but not limited to, one or more speakers or any of a variety of digital or analog audio capable output ports, including, but not limited to, headphone jacks, XLR jacks, stereo jacks, Bluetooth links, RCA jacks, optical ports or USB ports, as described above. The display interface 206 may be associated with any number of visual or tactile interfaces incorporating any of a number of active or passive display technologies (e.g., electronic-ink, LCD, LED or OLED, CRT, projection, etc.) or technologies for the display of Braille or other tactile information.

The memory 220 contains computer program instructions that the processor(s) 202 execute in order to implement one or more embodiments of the present disclosure. The memory 220 generally includes RAM, ROM and/or other persistent or non-transitory computer-readable media. The memory 220 may store an operating system 214 that provides computer program instructions for use by the processor(s) 202 in the general administration and operation of the computing device 102. The memory 220 may further include other information for implementing aspects of the present disclosure. For example, in one embodiment, the memory 220 includes a user interface module 212 that facilitates generation of user interfaces (such as by providing instructions therefor) for display. For example, a user interface may be displayed via a navigation interface such as a web browser installed on the computing device. In addition, memory 220 may include or communicate with an auxiliary content data store 240. Data stored in the content data store 230 may include audio content, image content, textual content, and/or other data similar to that discussed above with respect to presentation data store 114.

In addition to the user interface module 212, the memory 220 may include a presentation module 216 that may be executed by the processor(s) 202. In one embodiment, the presentation module 216 may be used to implement various aspects of the present disclosure, such as determining or requesting content associated with a given portion of primary audio content, presenting visual content for display during playback of audio content, etc., as described further below. In certain embodiments of the present disclosure, the presentation server 104 and/or content server(s) 106 may include several components that operate similarly to the components illustrated as part of the computing device 102, including a user interface module, processor, computer readable medium drive, etc.

Figure 3:
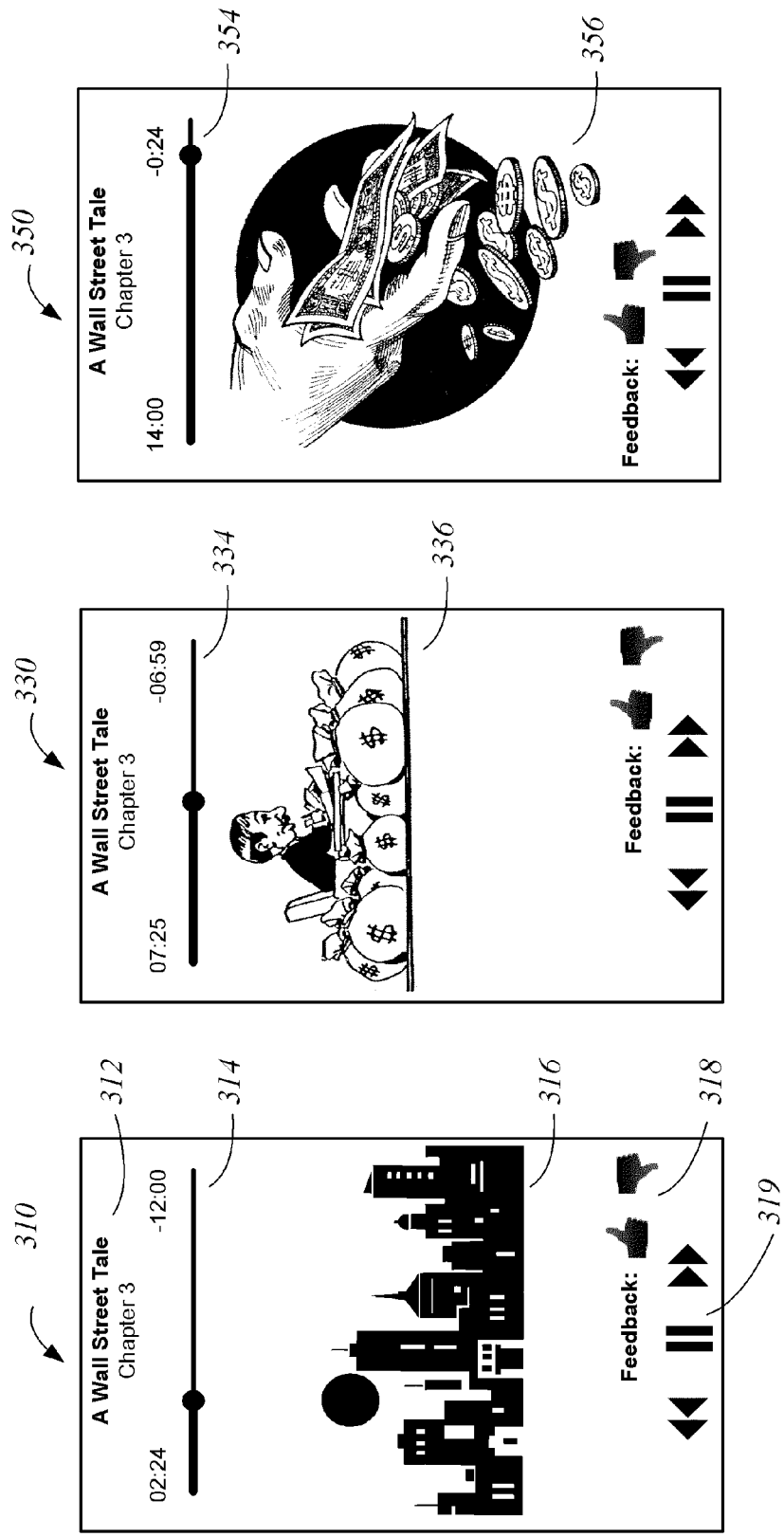
FIG. 3 includes illustrative user interfaces generated for display by a computing device during playback of audio content, where the user interfaces include content determined to be related to the audio content.

FIG. 3 includes illustrative user interfaces 310, 330 and 350 generated by the computing device 102 and/or the presentation server 104 for display by computing device 102 during playback of audio data. As illustrated, the user interfaces 310, 330 and 350 include image content determined by the computing device 102 and/or presentation server 104 to be related to respective portions of narration audio of an audio book being played by the computing device 102.

In the illustrated embodiment, user interface 310 may be presented for display by computing device 102 while computing device 102 is playing the audio content of an audio book 312, *A Wall Street Tale*. In some embodiments, computing device 102 may have previously received the audio content for audio book 312, *A Wall Street Tale*, from presentation server 104, content sever 106, or another network resource. In other embodiments, computing device 102 may have received streaming access to the audio content of audio book 312 from one or more network resources. After the computing device 102 received the audio content, or received access to the audio content, the user may have selected to listen to the audio content, such as by the computing device 102 outputting the audio content through speakers, headphones, or other output device associated with computing device 102. As illustrated by audio status bar 314, audio playback of the audio content by computing device 102 is currently at the 02:24 time mark of Chapter 3 (two minutes and twenty-four seconds into the chapter) of audio book 312, with twelve minutes (indicated by "12:00") of audio content remaining in the chapter. The user may select audio control options 319 in order to pause playback of the audio, or to skip backwards or forwards within the audio content.

Illustrative user interface 310 includes an image 316 that has been selected by the computing device 102 or presentation server 104 according to aspects of the present disclosure described further below. While user interfaces 310, 330 and 350 will be described below in terms of an embodiment in which a presentation module 216 of computing device 102 determines image content to display, it will be appreciated that the content, in other embodiments, may be determined at least in part by the presentation server 104 and sent to the computing device 102 for display. In the illustrated embodiment, image 316 may have been selected by the presentation module 216 for display because the image 316 has been determined to likely be related to subject matter discussed in the narration audio content of audio book 312 at or near the current time mark (02:24) of the audio content.

For example, as will be discussed in more detail below, the presentation module 216 may have determined one or more keywords associated with textual content representing the spoken words in portions of audio content surrounding the 02:24 time mark, then sent a request to content server 106 for an image associated with the one or more determined keywords. The displayed image 316 may have been received by the presentation module 216 in response to the request, in some embodiments, because image 316 is associated with metadata indicating that the image is related to one or more of the keywords associated with the image request. In this example, the one or more keywords may have been, for example, "New York city" and "sunset," based on those terms appearance in textual content representing the narration audio near the 02:24 time mark, or based on predetermined keywords associated with the audio book 312. The textual content may be, for example, companion content that was previously synchronized with the narration audio content, such as a transcript from which a narrator read when recording the narration audio, or an electronic book version of the same underlying work as the audio book 312.

Systems and methods for creating narration audio that is aligned with a transcript are disclosed in U.S. patent application Ser. No. 12/880,947, filed Sep. 13, 2010, entitled "SYSTEMS AND METHODS FOR CREATING NARRATION AUDIO," which is hereby incorporated by reference in its entirety. Systems and methods for synchronizing companion content, as well as various formats and types of synchronization content, are disclosed in U.S. patent application Ser. No. 12/273,473, filed Nov. 18, 2008, entitled "SYNCHRONIZATION OF DIGITAL CONTENT," and U.S. patent application Ser. No. 13/070,313, filed Mar. 23, 2011, entitled "SYNCHRONIZING DIGITAL CONTENT," each of which is hereby incorporated by reference in its entirety.

As illustrated, user interface 310 includes options 318 which the user may select in order to indicate that the user either likes image 316 or dislikes image 316. As will be discussed in more detail below, feedback provided by a user, such as by selection of one of options 318, may be considered by the presentation module 216 when selecting keywords and/or images to associate with audio content. In some embodiments, selection of the dislike option from options 318 may cause the presentation module 216 to replace image 316 in user interface 310 with a different image to be displayed to the user. In some embodiments, collective feedback received from multiple users over time may allow the presentation module 216 to display content that is generally liked by users with respect to that image's association with a given portion of audio content, a given audio book as a whole, and/or across different audio books. In some embodiments, a user interface similar to user interface 310 may present the user with multiple images at one time, such that the user may select which of the different image options the user prefers to view during playback of the given portion of audio content (not illustrated in FIG. 3).

Relative to illustrative user interface 310, illustrative user interface 330 may be presented by computing device 102 to the user during playback of a later portion of the audio content of audio book 312. Specifically, audio status bar 334 of user interface 330 indicates that the user is currently listening to the audio content at time mark "07:25" (seven minutes and twenty-five seconds) of Chapter 3. The image 336 displayed in user interface 330 may have been determined by the presentation module 216 to be related to the subject matter of the portion of audio content at or near the 07:25 time mark of Chapter 3 of audio book 312, and/or related to the subject matter of audio book 312 in part or as a whole, according to aspects of the present disclosure. For example, the portion of audio content at or near the 07:25 time mark may describe an accountant calculating a company's profits. The presentation module 216 may have analyzed textual companion content corresponding to the given portion of audio content and determined that the keywords "banker" and "money" are related to the given portion of audio content. The displayed image 336 may have been selected or requested by the presentation module 216 for display in user interface 330, for example, because image 336 is associated with metadata indicating that the image is related to the terms "banker" and/or "money."

Depending on the embodiment and optional user settings that may indicate the length of time between images displayed by the computing device 102 during audio playback, the computing device may have presented one or more additional images or other content during playback of the audio content between the 02:24 time mark at which user interface 310 was presented for display and the 07:25 time mark at which user interface 330 was presented for display. As will be discussed in more detail below, various transitions or other visual effects may be generated by the presentation module 216 in between display of different images, such as image 316 and image 336.

As indicated by audio status bar 354 of user interface 350, user interface 350 may be presented for display by the computing device 102 while the computing device 102 plays the audio content at time mark "14:00" (fourteen minutes) of Chapter 3's audio content. The image 356 displayed in user interface 350 may have been determined by the presentation module 216 to be related to the subject matter of the portion of the audio content at or near the 14:00 time mark of Chapter 3 of audio book 312, and/or related to the subject matter of audio book 312 in part or as a whole. While the user may be presented with user interface 350 after listening to fourteen minutes of audio content of Chapter 3, the user interface 350 may instead, in some embodiments, be presented to the user in response to the user requesting to fast forward or jump to the fourteen minute mark of the audio content of Chapter 3, such as by the user selecting to advance the audio status bar 354 to the point illustrated in user interface 350.

Figure 4:
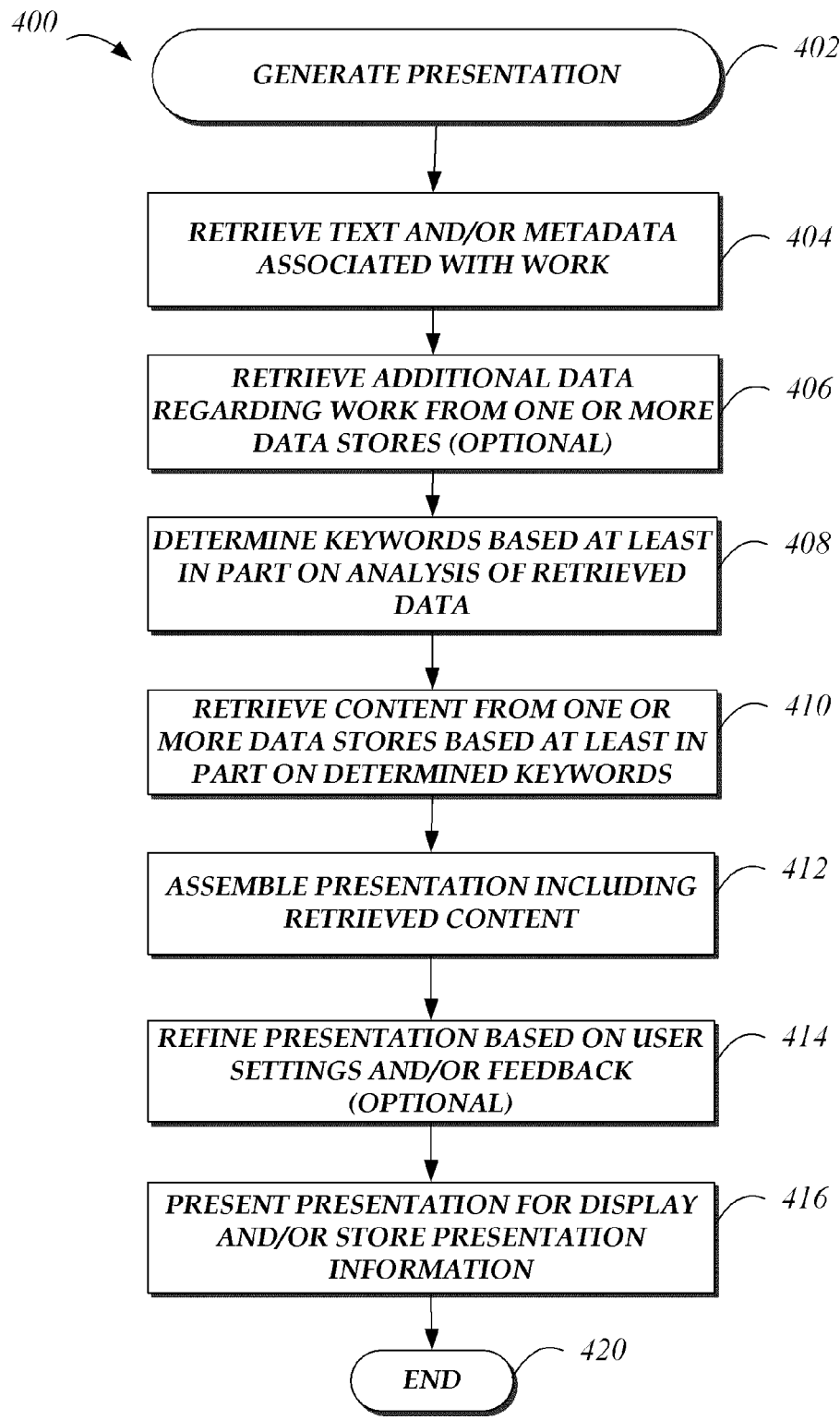
FIG. 4 is a flow diagram of an illustrative method implemented by a user computing device or a presentation server for generating a presentation associated with primary audio content.

FIG. 4 is a flow diagram of an illustrative method 400 implemented by user computing device 102 and/or presentation server 104 for generating a presentation associated with primary audio content. While illustrative method 400 will be described below as implemented by the presentation module 216 of computing device 102, it will be appreciated that, in other embodiments, illustrative method 400 may be implemented at least in part by the presentation server 104. Illustrative method 400 will be described in terms of an embodiment in which the primary audio content is narration audio content of an audio book. However, illustrative method 400 is not limited to narration audio or to audio books. For example, in some embodiments, the primary audio content may include music content or other content besides spoken words or narration. Furthermore, while images will be used as an example of the additional content incorporated into the presentation by illustrative method 400, the additional content may include, in some embodiments, video content, additional audio content and/or other types of content, as previously described.

As described in more detail below, illustrative method 400 may be implemented by presentation module 216 in order to generate a presentation to be presented by computing device 102 during playback of a given portion of audio content. According to different embodiments, the portion of audio content for which a presentation is generated during a given implementation of illustrative method 400 may be an entire audio book, a chapter of an audio book, a certain number of pages of an electronic book associated with the audio content, a certain time length of audio content (such as a certain number of minutes of audio content from a given starting point), or any other portion. In some embodiments, illustrative method 400 may be implemented for a given portion of audio content when a user selects to listen to the given portion of audio content. In other embodiments, illustrative method 400 may be implemented in real time or near real time while the computing device is playing audio content of an audio book. In some embodiments, illustrative method 400 may be implemented in advance of a user selecting to listen to an audio book, such as embodiments in which presentation information may be stored and later retrieved from a data store and/or received from another computing device or server, such as presentation server 104.

Illustrative method 400 begins at block 402, then proceeds to block 404, where the presentation module 216 retrieves, from one or more data stores, textual content and/or metadata associated with the audio content and/or with an underlying work associated with the audio content. For example, the underlying work may be a book, and the narrative or other content of the book may be embodied in one or more print versions of the book, one or more movie versions, one or more audio book versions, one or more transcripts, etc. The textual content retrieved from one or more data stores at block 404 may be, for example, from an electronic book or transcript representing the same or similar text as words spoken in narration audio content of the audio book.

As discussed above, the retrieved textual content may be considered companion content of the audio book, according to some embodiments. The companion content may have been previously synchronized with the narration audio content, such as a transcript from which a narrator read when recording the narration audio, or an electronic book version of the same underlying work as the narration audio content. As described in more detail in U.S. patent application Ser. No. 13/070,313, entitled "SYNCHRONIZING DIGITAL CONTENT," which is incorporated by reference above, content synchronization information can include reference points mapping portions of the companion content to corresponding portions of the audio content. In a specific example, content synchronization information can include data that can be used to map a segment of text (such as a word, line, sentence, etc.) of the companion content to a timestamp of a corresponding portion of the audio content.

The metadata retrieved by the presentation module 216 from one or more data stores at block 404 may include information regarding the audio data and/or information regarding the underlying work associated with the audio data, such as a book. For example, metadata may include information identifying an author, publisher, summary, genre, year of publication, images, etc. The retrieved metadata may include data or content associated with different versions of the underlying work, such as images from a movie version of the book. In some embodiments, the metadata may include images or references to images that have been provided by an author, publisher, or distributor of the book, such as exclusive images associated with the book or its content that are not available from other sources. In some embodiments, the metadata may include predetermined tags or keywords indicating subject matter associated with the audio content and/or the underlying work.

At block 406, the presentation module 216 may optionally retrieve additional data regarding the work from one or more data stores. In other embodiments, the presentation module 216 may optionally send a request for such additional data regarding the work to one or more computing devices or servers, such as presentation server 104 and/or one of content servers 106, then receive the additional data in response to the request. Additional data may include reviews of the work, user-generated content associated with the work, information identifying people, characters, real places and/or fictional places associated with the work, other works that reference or relate to the given work, etc.

Next, at block 408, the presentation module 216 determines one or more keywords associated with a portion of the audio content, or with the audio content as a whole, based at least in part on an analysis of the companion content and/or other data retrieved at block 404 and/or block 406. The keywords associated with a given portion of content at block 406 may generally be intended to represent subject matter that is discussed in the audio content or otherwise associated with the audio content. In some embodiments, the presentation module 216 may determine the one or more keywords at block 408 by analyzing the textual content of the companion content. The presentation module 216 may, in some embodiments, search the companion content for words or terms that appear frequently or that are relatively concentrated in a given portion of the companion content. For example, if a given page or other portion of the companion content includes the word "beach" a number of times, "beach" may be determined by the presentation module 216 to be a keyword associated with the given portion of the companion content or with the corresponding portion of the audio content (such as based on synchronization information synchronizing the companion content and the audio content).

In determining the one or more keywords to associate with a given portion of the audio content or with the audio content as a whole, the presentation module 216 may consider the concentration of a word or phrase over various lengths of content, such as a page of content, chapter of content, a minute of audio content, etc. Certain common words (such as "the" and other articles, prepositions, etc.) or words that are not often indicative of specific subject matter (such as a generic first name or certain adjectives or adverbs) may be ignored by the presentation module 216 when determining keywords. In some embodiments, words or phrases that are all related to the same general theme or subject, or that are synonymous with each other, may be grouped together by the presentation module 216 when determining concentration of keywords. For example, if a given page of an electronic book includes both the terms "TV" and "television" in the text, the presentation module 216 may consider the total number of times that either of these terms appear when determining whether to associate the keyword "television" with the given portion of the audio content. In some embodiments, the presentation module 216 may make multiple passes through a given portion of audio content or companion content, such that the keywords are refined or narrowed in each pass in order to determine the most relevant keywords.

When determining keywords, in some embodiments, the presentation module 216 may also consider one or more types of additional metadata or other data retrieved at block 404 and/or block 406, such as plot summary information, names of characters or people appearing in the audio book, time period information, etc. For example, in some embodiments, if the presentation module 216 has determined from a list of a book's characters that "Georgia" is a name of a character in the book, the presentation module 216 may determine that "Georgia" should not be determined to be a keyword even when the word "Georgia" appears frequently in a portion of the book. Such a determination may be made, for example, because images associated with the keyword "Georgia" may tend to be associated with the state of Georgia, rather than the character named Georgia in the book.

Once the presentation module 216 has determined one or more keywords associated with a given portion of the audio content, the presentation module 216, at block 410, retrieves or requests additional content based at least in part on the one or more determined keywords. The additional content may include, for example, image content, video content, textual content, audio content, and/or other types of content associated with at least one of the determined keywords. In some embodiments, the additional content may be retrieved by the presentation module 216 from one or more data stores, such as content data store 240. In other embodiments, the presentation module 216 may send a request to another computing device, such as one or more of content servers 106, for an image or other content item. The request may include one or more of the keywords that the presentation module 216 determined to be related to the audio content. As mentioned above, one or more of content servers 106 may provide access to various third-party content data stores, such as content data store 112, that include image content, video content, textual content, audio content, and/or other types of content that are available for public use (such as royalty-free content) or for use according to a license.

The additional content retrieved at block 410 may be determined by the presentation module 216 to be related to a keyword based on metadata associated with the additional content. For example, an image stored in content data store 240 may include stored metadata that indicates one or more keywords associated with the image. As an example, an image stored in content data store 240 that is a photo of a beach at sunset may include metadata that indicates that the image is associated with the keywords "beach," "sunset," and "ocean." Such an image may be retrieved by the presentation module 216 at block 410 to be associated with a portion of audio data that the presentation module 216 associated with the keyword "beach" at block 408. In some embodiments, the presentation module 216 may additionally or alternatively determine keywords that should be associated with an image or other content item based on image recognition that identifies keywords that should be associated with the image or other content item.

In some embodiments, retrieving content from one or more data stores at block 410 may include retrieving user-generated or user-provided content. For example, the user to whom the audio book will be played may, in some embodiments, provide images or other content for consideration by the presentation module 216 when the presentation module determines additional content to associate with portions of the primary audio content. The user may optionally provide an indication of keywords that should be associated with the content provided by the user.

At block 412, the presentation module 216 assembles a presentation that includes the additional content retrieved at block 410. In some embodiments, assembling a presentation may include associating each piece of additional content retrieved at block 410 with a given portion of the audio content. For example, the presentation module 216 may associate each retrieved image or other content item with a beginning time mark and/or ending time mark within the audio content (or a beginning and/or end point in the audio data without regard to playback time markers), thereby indicating the portion of the audio content during which the additional content should be presented to the user when the audio content is played. In an embodiment in which a presentation is generated for a chapter of audio content at a time, for example, the result of block 412 may include presentation information that identifies a number of different images (previously retrieved at block 410 based on keywords), where each image is associated with a distinct portion of the chapter, such as a thirty second block of time, a one minute block of time, a paragraph, a page, etc.

At block 414, the presentation module 216 optionally refines the presentation based on user settings and/or user feedback. User settings and user feedback will be discussed below with reference to FIGS. 5 and 6. In general, refining the presentation may include applying one or more filters or visual effects to one or more of the images or other content of the presentation. For example, an otherwise static image may gradually pan and/or zoom in or out while presented for display during playback of a given portion of audio content. As another example, refining the presentation may include inserting visual transitions between images or other content. Refining the presentation may include, in some embodiments, adjusting the timing between display of different content and/or replacing one or more images with user-selected or user-provided images according to a user's settings and/or feedback previously received from the user or other users.

At block 416, the presentation module 216 presents the presentation for display and/or stores the presentation information in a data store, such as content data store 112. For example, in an embodiment in which illustrative method 400 is implemented in real time or near real time while the computing device is playing the audio content, the presentation module 216 may present the presentation for display at block 416. Presenting the presentation for display may include presenting the additional content (such as images, audio and/or video) associated by the presentation module 216 with various portions of the audio content while the corresponding audio content is output to the user. In some embodiments, the presentation module 216 may consider the user's level of engagement when determining which additional content to present. For example, if the user has recently made selections or otherwise actively engaged with the presented content, the presentation module 216 may present the user with relatively higher quality additional content (or content that is associated with a higher cost) than if the user has not actively engaged with the content recently. The presented presentation may also include, in some embodiments, one or more effects, filters, transitions, etc., as described further below. In other embodiments in which the presentation is generated prior to a user selecting to listen to the audio content, the presentation module 216 may store the presentation information at block 416 such that the presentation may later be presented by the computing device 102, or may be presented by another computing device that is provided access to the stored presentation information. As will be appreciated, presentation information (such as keywords associated with a portion of audio content, time marker information, references to locations of additional content files, information identifying a certain filter or effect to apply to an image, etc.) may be stored without storing the full audio and visual result of the presentation. For example, in some embodiments, storing the presentation may involve storing sufficient information from which the presentation module 216 may later determine what content to present at what point in the playback of the primary audio content. The illustrative method 400 ends at block 420.

Figure 5:
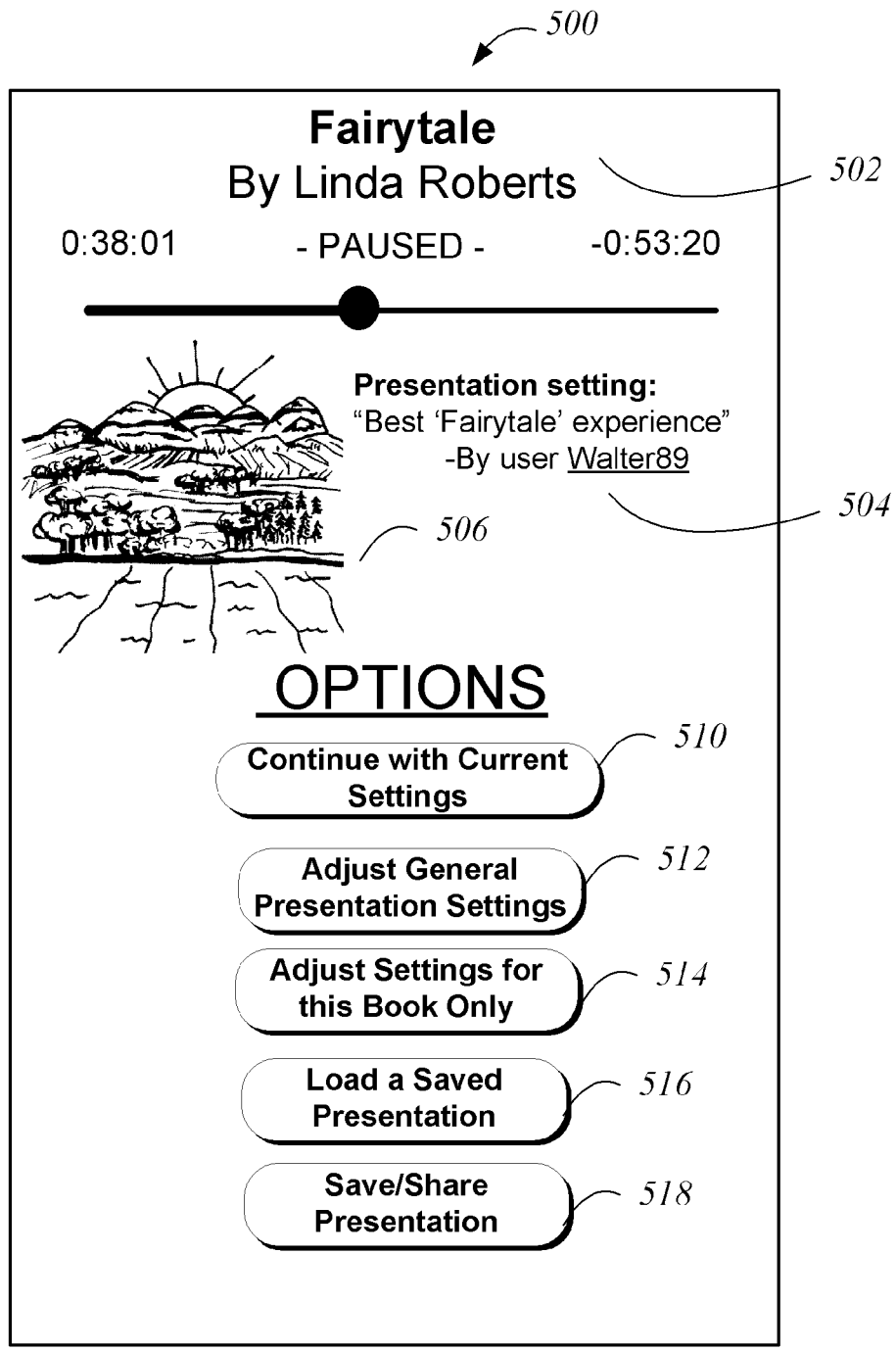
FIGS. 5 and 6 are illustrative user interfaces generated by a computing device for selecting options associated with the presentation of audio data and associated visual data.

FIG. 5 is an illustrative user interface 500 generated by the computing device 102 that enables a user of the computing device to select options associated with a presentation. As illustrated, user interface 500 may be presented for display when the user has selected to pause playback by computing device 102 of the audio content of audio book 502, *Fairytale*, or simply selected to view presentation options while the audio content continues to play.

Image 506 may be an image associated with the given portion of audio content that was previously presented for display in a larger form while the user listened to the audio content, prior to the options being displayed. A user interface similar to user interface 500 may also or alternatively be displayed when the user first selects to listen to audio book 502 or to a given chapter or other portion of audio book 502.

As illustrated, user interface 500 includes current presentation identification information 504, which indicates that the current presentation settings are identified as "Best 'Fairytale' experience" by user "Walter89." The presentation settings or stored presentation information may have been previously retrieved from either a local data store, such as content data store 240, or received from presentation server 104. For example, in some embodiments, presentation server 104 may provide functionality for users to share stored presentation information with other users, as discussed further below.

Illustrative user interface 500 includes option 510, which the user may select in order for the computing device 102 to resume presenting the presentation with the current settings. Alternatively, the user may select one of options 512 or 514 in order to indicate that the user would like to adjust the settings of the presentation. The user may select option 512 in order to indicate that the user would like to adjust the user's general preferences or default presentation settings across multiple audio books or other audio content. The user may select option 514 in order to indicate that the user would like to adjust the presentation settings for audio book 502 only, such as by adjusting the stored presentation information identified by presentation identification information 504. Adjustment of presentation settings is described below with reference to FIG. 6.

A user may select option 516 of user interface 500 in order to load previously stored presentation information. For example, in some embodiments, selection of option 516 may present the user with a user interface that allows the user to browse presentations that the user has previously stored and/or presentations that other users have stored and that are available for retrieval from a data store or to be received from presentation server 104. For example, presentation data store 114 may include presentations associated with a number of different audio books and which were created by a number of different users. The presentation server 104 may enable users to rank, review, provide commentary or otherwise provide feedback regarding the stored presentations. Accordingly, in some embodiments, the presentation server 104 may enable a user to browse or search the stored presentations according to popularity, rating, type, theme, mood, user, subject matter, etc. In some embodiments, the presentation server 104 may enable users to vote on the best presentations for certain audio books, certain chapters of audio books, or other portions of audio content. The user could then be given an option, for example, to retrieve the best Chapter Two experience for a given audio book according to user votes.

Once a presentation is selected by the user, the computing device 102 may receive the associated presentation information from presentation server 104, such that the computing device may present the selected presentation to the user when playback of the audio data of audio book 502 is resumed. Alternatively, the user may select option 518 in order to store the user's current presentation settings locally and/or remotely by sending the presentation information to presentation server 104.

Figure 6:
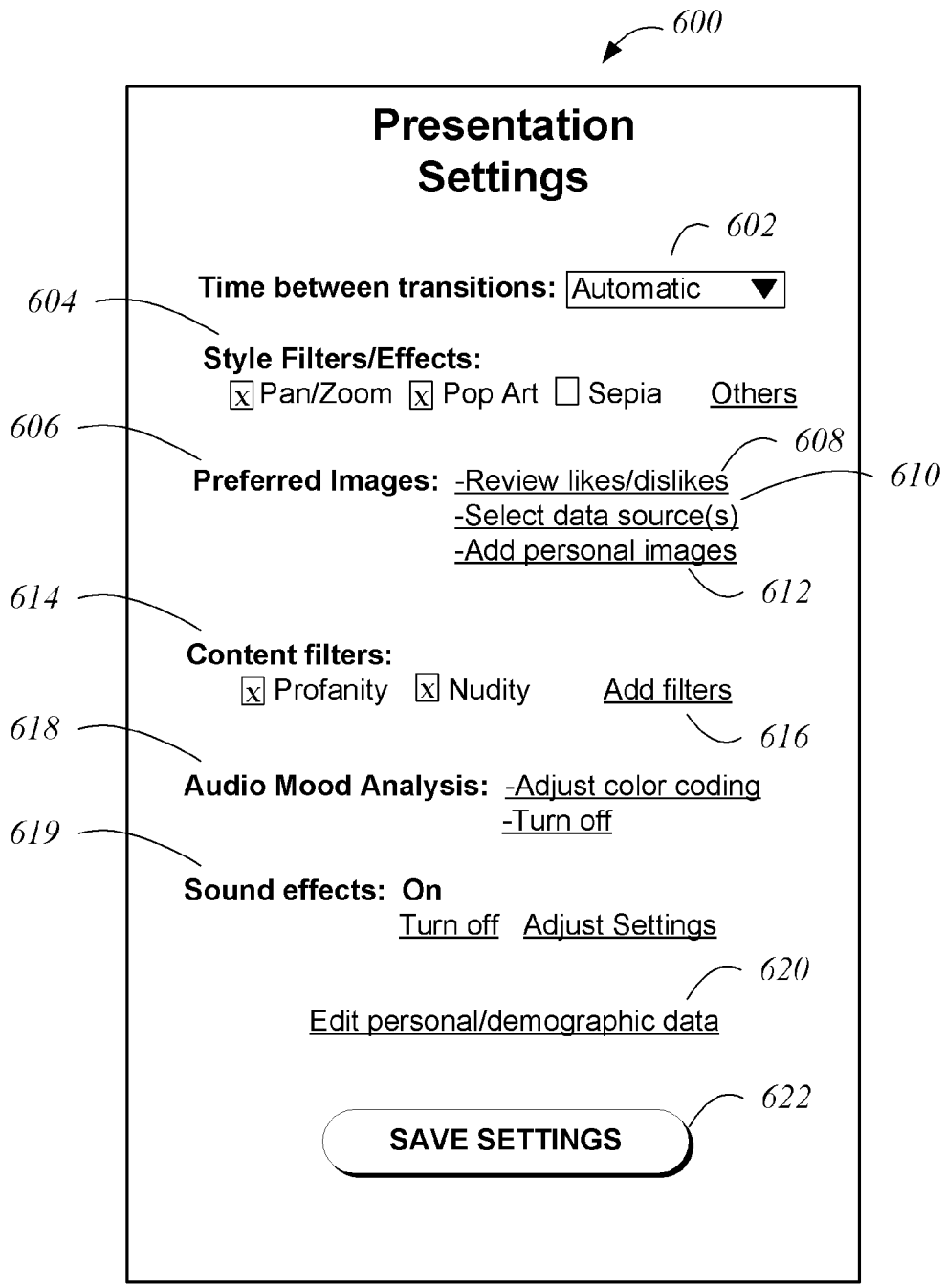

FIG. 6 is an illustrative user interface 600 generated by computing device 102 that enables a user to adjust presentation settings. For example, the user may select option 602 in order to adjust the time between transitions to different images or other content. As indicated, the current setting is "automatic," which may indicate that the presentation module 216 determines when to present a new image, video, or other content for display based on analysis of the corresponding audio content and/or companion content. As an example, a transition may automatically be applied at certain natural break points within the audio content, such as a new section or chapter. As another example, a transition may automatically be applied when certain transitional language is recognized in the audio content, such as the presentation module transitioning to content associated with the keyword "Paris" in response to a paragraph beginning "We finally landed in Paris." Selection of option 602 may enable the user to manually adjust the time that each image is displayed (such as thirty seconds, a minute, a paragraph, a page, etc.), or may include relative options such as slow or fast.

Options 604 of user interface 600 include identification of various style filters and visual effects that the user may either select or deselect to indicate whether the user would like the given filter or effect applied by the presentation module 216 to the presentation. For example, the "pan/zoom" option may simultaneously pan and zoom in or out on an image during display in the presentation such that a static image has the effect of movement. The "pop art" and "sepia" options may each be stylized filters applied to an image in order to adjust its appearance, such as by substituting colors or adjusting brightness, contrast and/or saturation. In some embodiments, a number of other filters or visual effects that are known in the art may additionally or alternatively be presented as options to the user to be applied to images or other content within a presentation. In some embodiments, one or more filters may restrict the content to be displayed to a certain style or subject matter, such as black and white content, content related to sports, content related to movies, illustrations, cartoons, paintings, photographs, bright content, dark content, landscape images, etc. In some embodiments, user preferences such as styles and subject matter of interest to the user may be automatically determined by the presentation module 216 based on feedback received from the user.

Options 606 may enable the user to select the user's preferences regarding what images or other content to display during a presentation. For example, option 608 may present the user with a user interface that displays the user's like and dislikes as determined by the user computing device 102 based on previous feedback from the user. As discussed above, such feedback may have been received based on the user's selection of a "like" or "dislike" option during display of an image in a presentation. The user computing device 102 may, in some embodiments, determine the user's likes and/or dislikes by analyzing metadata associated with the images for which the user has provided feedback. Option 610 may enable the user to select data sources for additional content, such as by enabling the user to identify a data source that the user prefers and/or a data source from which the user does not want to be presented content. For example, a user may indicate that the user is interested in content from a certain data store that primarily includes professional photographs, but is not interested in content from a certain server that provides primarily user-generated videos. The user may select option 612 in order to select one or more of the user's own images, videos, or other content (such as by selection of a given file directory or folder) which the user would like for the computing device 102 to potentially incorporate into one or more presentations.

If the user would like for the presentation module 216 to apply one or more content filters when selecting images or other content to include in a presentation, the user may select one or more of options 614, which include a profanity filter and nudity filter. The presentation module 216 may then apply such as filter when selecting images or other content by analyzing metadata of images or other content to potentially include in the presentation and/or analyzing the potential content itself for certain textual content, visual content or verbal content. As will be appreciated, a number of other filters may be provided in certain embodiments.

In some embodiments, audio mood analysis option 618 may be selected by the user in order for visual effects to be applied to the presentation based on an analysis by the presentation module 216 of the tone, semantics, volume, and/or other characteristics of the audio content. For example, color coding may be applied by the presentation module 216 such that an otherwise neutral-color image would be presented for display with a red hue applied when a corresponding portion of narration audio content indicates an angry tone to the narrator's voice. A user may select option 619 in order to adjust sound effects options, such as turning sound effects on or off as whole, or selecting specific types of sound effects to turn on or off. For example, in some embodiments, sound effects may be a type of additional content that may optionally be provided during a presentation in addition to primary audio content, such as an audio book. Sound effects may include, for example, bird sounds, wind noise, cricket sounds, ominous tones, etc. Lastly, a user may select option 620 in order to edit the user's personal information and demographic information, which may be used by the presentation module 216, in certain embodiments, when determining default presentation settings for the user. The user may select option 622 in order for the presentation module to store the presentation settings in one or more data stores either local to or remote from computing device 102.

Figure 7:
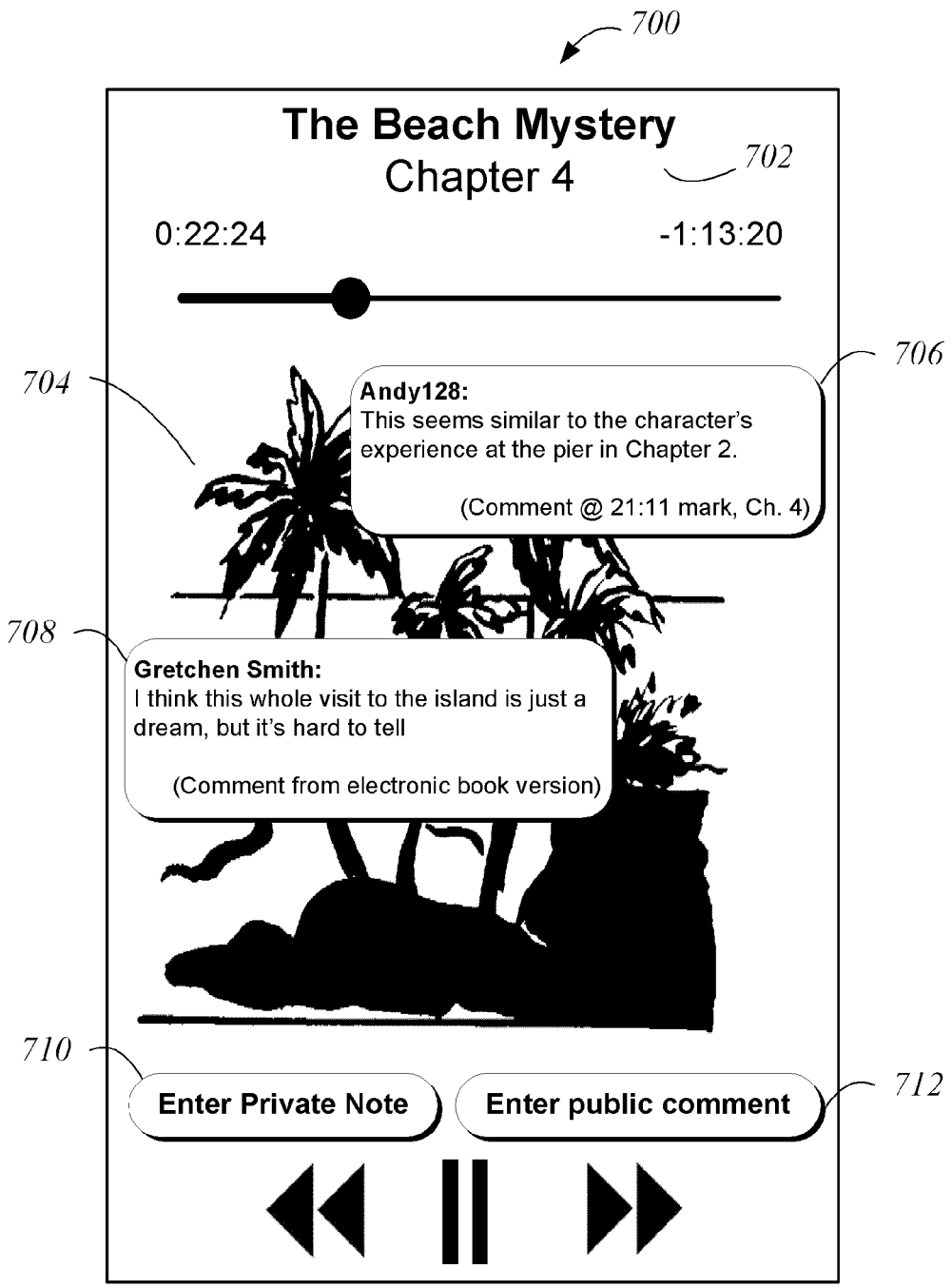
FIG. 7 is an illustrative user interface generated by a computing device that displays user comments associated with a given portion of audio data during playback of the corresponding portion of audio data.

FIG. 7 is an illustrative user interface 700 generated by computing device 102 that displays user comments 706 and 708 associated with a given portion of audio data from audio book 702 during playback of the corresponding portion of audio data. User interface 700 may be presented for display to a user in an embodiment in which a presentation is supplemented with one or more other users' comments regarding a given portion of the audio content being played to the user. As illustrated, user interface 700 includes an image of an island 704. Image 704 may be associated with audio book 702 as a whole (for example, the image may be cover art associated with the underlying book, *The Beach Mystery*), or may have been associated by the presentation module 216 with the currently playing portion of narration audio data of audio book 702 according to aspects of the present disclosure described above.

Each of user comments 706 and 708 may have been received by the computing device 102 from the presentation server 104, or retrieved by the computing device 102 from one or more data stores. Comment 706 is a comment entered by a user identified as "Andy128" with reference to the 21:11 time mark of Chapter Four (as indicated in user interface 700, the current time mark in the playback of Chapter Four's audio content is 22:24). Comment 706 may have been entered by user Andy128 using a computing device while he listened to the audio content of Chapter Four, then sent to the presentation server 104, then sent by the presentation server 104 to user computing device 102. Comment 708, as indicated, may have been entered by user "Gretchen Smith" using a computing device such as an electronic book reader, while she read a corresponding portion of an electronic book version of the same book. The computing device 102 may have associated the comment 708 with the current portion of audio data based on synchronization data associated with the textual content of the electronic book and the audio data of audio book 702. In some embodiments, a comment entered by a user may be associated with a certain image or other piece of additional content that was displayed to the user during playback of the audio content. For example, a user may enter a comment such as "This image does not do the writing in this chapter justice"

(not illustrated), which may be associated with both a given image and a given portion of audio content.

The user may select option 710 in order to enter a private note regarding the current portion of the audio content of audio book 702. For example, selection of option 710 may enable the user to type text that the computing device 102 then associates with the current time mark of the audio content. The computing device 102 may then store the comment and audio content association information in a data store that is not publicly accessible by other users. Alternatively, if the user selects to enter a public comment by selecting option 712, the computing device 102 may send the comment and audio content association information to the presentation server 104, such that the comment may be presented to other users when those users listen to the corresponding portion of the audio content.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   a data store that stores audio content; and
   a computing device, comprising one or more processors, in communication with the data store and that is configured to at least:
      receive a request for playback of at least a subset of the audio content stored in the data store;
      in response to the request for playback of the at least a subset of the audio content:
         retrieve, from one or more data stores, companion content associated with the audio content, the companion content including textual content representing words spoken in the audio content;
         determine a first keyword associated with a first portion of the textual content, wherein the first keyword is a word selected from a plurality of words included in the first portion of the textual content;
         determine a second keyword associated with a second portion of the textual content;
         send to a second computing device a request for visual content associated with the first keyword and the second keyword, wherein the request includes the first keyword and the second keyword;
         receive, from the second computing device, a first image associated with the first keyword and a second image associated with the second keyword, wherein the first image is different than the second image; and
         automatically present for display at least the first image and the second image at different times during playback of corresponding portions of the audio content, such that (a) the first image is presented for display during playback of a first audio content portion corresponding to the first portion of the textual content and (b) the second image is presented for display during playback of a second audio content portion corresponding to the second portion of the textual content.

2. The system of claim 1, wherein the audio content comprises an audio book.

3. The system of claim 1, wherein the companion content is associated with synchronization information that associates each portion of the textual content with a portion of the audio content.

4. A computer-implemented method comprising:
   as implemented by one or more computing devices configured with specific executable instructions,
      receiving a request for output of audio content;
      in response to the request for output of the audio content:
         retrieving, from one or more data stores, companion content associated with the audio content, the companion content including textual content representing words spoken in the audio content;
         determining a first keyword associated with a first portion of the textual content;
         determining a second keyword associated with a second portion of the textual content;
         retrieving, from one or more data stores, a first visual content item associated with the first keyword and a second visual content item associated with the second keyword; and
         causing presentation of the first visual content item and the second visual content item during output of corresponding portions of the audio content, such that (a) the first visual content item is presented during output of an audio content portion corresponding to the first portion of the textual content and (b) the second visual content item is presented during output of an audio content portion corresponding to the second portion of the textual content.

5. The computer-implemented method of claim 4, wherein the first visual content item comprises at least one of an image or a video.

6. The computer-implemented method of claim 4, wherein the audio content comprises narration audio content.

7. The computer-implemented method of claim 4, wherein the first visual content item is determined to be associated with the first keyword based at least in part on metadata associated with the first visual content item.

8. The computer-implemented method of claim 4, further comprising storing presentation information identifying a plurality of images, wherein the presentation information includes information that associates each image of the plurality of images with at least a portion of the audio content.

9. The computer-implemented method of claim 8, wherein the presentation information includes presentation settings associated with a user.

10. The computer-implemented method of claim 8, wherein the presentation information includes information identifying a visual effect to be applied to at least a portion of the visual content when the visual content is presented.

11. The computer-implemented method of claim 4, wherein the first keyword associated with the first portion of the textual content is determined to be a word that appears two or more times in the first portion of the textual content.

12. A non-transitory computer-readable medium storing computer executable instructions that, when executed by one or more computing devices, configure the one or more computing devices to perform operations comprising:
receiving a request for playback of narration audio content;
in response to the request for playback of the narration audio content:
determining a first keyword associated with a first portion of textual content, wherein the textual content represents words included in the narration audio content;
determining a second keyword associated with a second portion of the textual content;
retrieving, from one or more data stores, a first visual content item associated with the first keyword and a second visual content item associated with the second keyword; and
automatically presenting (a) the first visual content item during playback of a portion of the narration audio content corresponding to the first portion of the textual content and (b) the second visual content item during playback of a portion of the narration audio content corresponding to the second portion of the textual content.

13. The non-transitory computer-readable medium of claim 12, wherein the first visual content item comprises an image, wherein presenting the first visual content item comprises presenting the image for display.

14. The non-transitory computer-readable medium of claim 13, wherein a different image is presented for display during playback of each of two or more portions of the narration audio content.

15. The non-transitory computer-readable medium of claim 12, wherein the first visual content item and the second visual content item are retrieved from the one or more data stores during playback of the narration audio content.

16. The non-transitory computer-readable medium of claim 12, wherein the operations further comprise:
receiving user feedback regarding at least one of the first visual content item or the second visual content item.

17. A system comprising:
a data store that stores audio content; and
a computing device, comprising one or more processors, in communication with the data store and that is configured to at least:
receive a request for playback of at least a subset of the audio content stored in the data store;
in response to the request for playback of the audio content:
retrieve, from one or more data stores, companion content associated with the audio content, the companion content including textual content representing words that are audible in the audio content;
determine a first keyword associated with a first portion of the textual content;
determine a second keyword associated with a second portion of the textual content;
retrieve, from one or more data stores a first visual content item associated with the first keyword and a second visual content item associated with the second keyword; and
cause presentation of the first visual content item and the second visual content item during output of corresponding portions of the audio content, such that (a) the first visual content item is presented during output of an audio content portion corresponding to the first portion of the textual content and (b) the second visual content item is presented during output of an audio content portion corresponding to the second portion of the textual content.

18. The system of claim 17, wherein the first visual content item comprises at least one of image content or video content.

19. The system of claim 17, wherein the computing device is further configured to:
retrieve, from one or more data stores, one or more user comments associated with a portion of the audio content, wherein each of the one or more user comments comprises textual content; and
cause display of at least one of the one or more user comments during output of a corresponding portion of the audio content.

20. The system of claim 19, wherein the computing device is further configured to determine that the one or more user comments are associated with a portion of the audio content based at least in part on the one or more user comments being associated with a corresponding portion of the companion content.

* * * * *